R. REA AND F. W. WATERS.
STEAM BLEACHING APPARATUS.
APPLICATION FILED NOV. 29, 1918.

1,328,397.

Patented Jan. 20, 1920.

Inventors:
Robert Rea
By Frank W. Waters
H. S. Bailey    Attorney.

UNITED STATES PATENT OFFICE.

ROBERT REA AND FRANK W. WATERS, OF PORTLAND, OREGON.

STEAM BLEACHING APPARATUS.

1,328,397.  Specification of Letters Patent.  Patented Jan. 20, 1920.

Application filed November 29, 1918. Serial No. 264,703.

*To all whom it may concern:*

Be it known that we, ROBERT REA and FRANK W. WATERS, citizens of the United States of America, residing at Portland, county of Multnomah and State of Oregon, have invented a new and useful Steam Bleaching Apparatus for Use in the Interiors of Fruit, Vegetable, and other Food Dehydrating Driers, of which the following is a specification.

Our invention relates to a new steam bleaching apparatus for use in the interiors of fruit and vegetable and other food dehydrating hot air driers, and the objects of our invention are:

First, to provide a steam bleaching apparatus for giving intermittent steam bleaching treatments, inside of the fruit and vegetable driers of dehydrating plants, to the products to be dried that require that character of bleaching treatment.

Second, to provide a reciprocating counter balanced perforated pipe frame adapted to give intermittent steam bleaching treatments at predetermined times to certain products to be dried in fruit and vegetable dehydrating plants, and that is arranged in connection with the drier to coöperate with it in its drying treatments of products that need steam bleaching treatments.

We attain these objects by the mechanism illustrated in the accompanying drawings, in which.

Similar letters of reference refer to similar parts throughout the several views.

Figure 1:
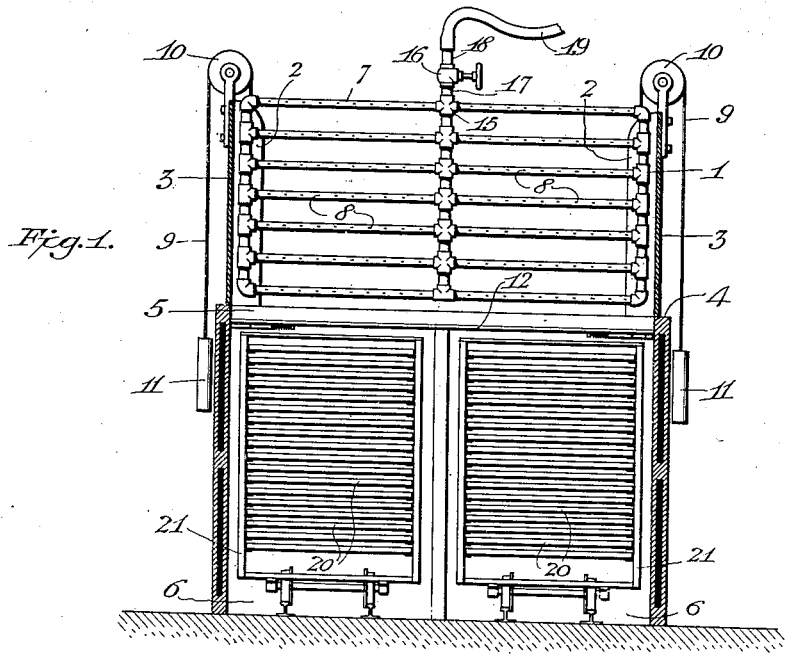
Figure 1 is a transverse sectional view, through a dehydrating drier, showing the same equipped with the improved steam bleaching apparatus.
Figure 2:
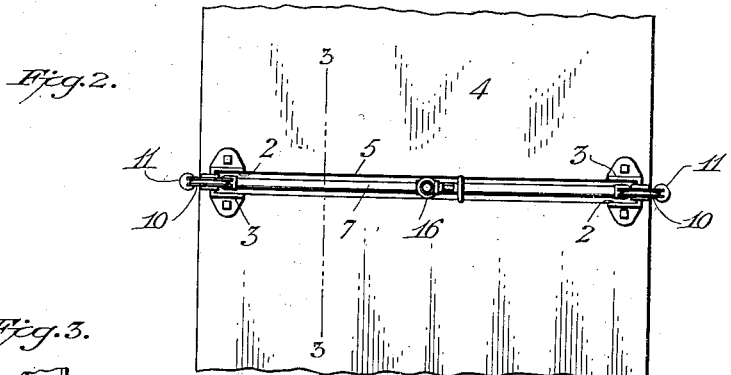
Fig. 2 is a plan view of a portion of a drier showing an opening or slot in the roof thereof, and the steam bleaching apparatus supported in position to be passed down through said slot into the drier.
Figure 3:
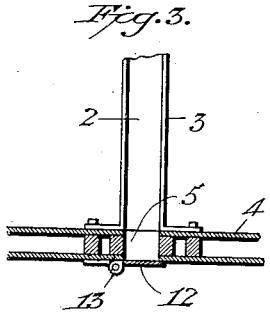
Fig. 3 is a sectional view on the line 3—3 of Fig. 2, showing the door which normally closes the slot in the roof.
Figure 4:
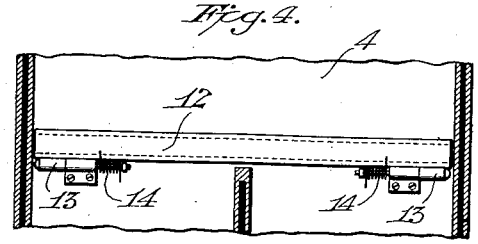
Fig. 4 is a bottom plan view of a portion of the roof, showing the door which covers the slot therein, and the springs which normally hold the door in a closed position.

Referring to the drawings:

The several main figures illustrate a steam bleaching apparatus embodying our invention.

We have illustrated our steam bleaching apparatus in its operative position in a fragmentary view of one end of a fruit and vegetable dehydrating drying furnace, a full description of which may be seen in our pending applications, Serial Numbers 264,710 and 264,706, filed Nov. 29, 1918, for a process and its operating apparatus, and for a fruit and vegetable dehydrating furnace drier.

In the drawings, the numeral 1 designates a supporting frame which is slidably mounted in slideways 2, that are formed in vertical standards 3, that are secured to and project above the roof 4, of the drier. A slot 5, is formed in the roof of the drier in line with the slideways, that is made to allow the frame 1 of the bleaching apparatus to slide down through it into the drier.

We preferably arrange our steam bleaching apparatus across the entrance to the fruit drying chambers 6 of the drier, as it is especially adapted to driers that are large enough to receive the fruits and vegetables to be dried in car load lots, which are run on tracks into and through these chambers, and the steam bleaching treatment that our apparatus gives to the product is best given to the car load lots of product when they first enter these drying chambers, although if desired, our bleaching apparatus may be positioned at any other part of the drying chambers or of the drier.

The frame 1 is preferably made of piping and a plurality of horizontally positioned pipes are connected to its side members, and each of these horizontal pipes between the top member 7 and the bottom member is provided with a row of small perforations 8, that are positioned in these pipes to face the entrance to the chambers.

Our steam bleaching apparatus is counterbalanced to remain above the roof when pushed up through the slot 5, and this is accomplished by ropes 9, that run over pulleys 10, one end of each rope being attached to the opposite sides of the top member 7 of the frame, and the free ends of the ropes are provided with weights 11, heavy enough to counterbalance the frame in its slideways, as the frame will run up and down reciprocally in its slideways through the slot 5 in the roof of the drier when operated by an attendant who can lower the frame easily by reaching up and grasping the bottom member of the frame and pulling the frame down through the slot. The slot in the roof of the drier is closed when the pipe frame is above the roof, preferably by a cover or door member 12, which may be placed on the roof or on the ceiling inside of the drier. We preferably hinge this long narrow door against the ceiling by pivotal hinges 13, which allows it to swing up against or away from the ceiling, and we secure springs 14, to its opposite ends and to the ceiling in such a way that the springs normally hold the door closed over the slot and against the ceiling when the pipe frame is above the roof.

The top pipe is provided with a cross coupling 15, in which a valve 16 is connected by a nipple 17. A nipple 18, is also secured to the valve, and a piece of rubber hose 19, is secured, the opposite end of which is secured to a pipe that leads to a supply of steam under suitable pressure for this bleaching treatment, which requires but a moderate pressure.

The sliced product to be dried is placed on trays 20 that have a perforated or wire screen bottom, and are piled up in vertical piles on cars 21 and are spaced at a short distance apart in these vertical piles of trays.

This steam discharging pipe frame is used as a bleaching element, as the steam discharging from it flows between and above and below each tray on the cars of trays in the drying chambers, and it comes in contact with both sides of each piece of sliced fruit or vegetable on each tray and saturates them with the steam and acts to make them porous and to, in a measure, loosen up their cell structure and to bleach them so that they, when dried, will be and will retain their natural color. After an attendant has used the steam in this pipe frame, he raises it up through the roof and out of the way of cars of sliced product being moved into the drier to be dried. Some fruits do not need this steam treatment at this point in the drier. A separate steam treatment frame may be placed at the entrance of each chamber if desired.

Our invention provides a simple, inexpensive, easily handled bleaching apparatus that can be reciprocally moved in front of the car loads of product to be dried and then be easily moved out of the way of the incoming cars, and while we have illustrated and described the preferred construction and arrangement of our steam bleaching apparatus, we do not wish to be limited to it, as changes can be made without departing from the spirit of our invention.

Having described our invention, what we claim as new and desire to secure by Letters Patent, is:

1. A steam bleaching apparatus for a food drier, comprising a counterbalanced perforated pipe frame arranged and adapted to be moved in said drier into a position of use at predetermined times to give a steam bleaching treatment to the product to be dried within said drier, and means including a hose for connecting said perforated pipe frame to a supply of steam, and a valve arranged to control the steam flowing to and through said frame.

2. In a steam bleaching apparatus for a food drier, the combination of the drier provided with a slot in its roof and vertical slideway supports above said drier adjacent to the opposite ends of said slot, with the steam bleaching perforated pipe frame slidably mounted in the slideway supports, and means for counterbalancing the weight of said frame in said slideways.

3. In a steam bleaching apparatus for a food drier, the combination of the drier provided with a slot in its roof and vertical slideway supports above said drier adjacent to the opposite ends of said slot, with a steam bleaching perforated pipe frame slidably mounted in the slideway supports; the weighted rope pulleys supported on said slideway supports ropes extending over said pulleys, said ropes being secured at one of their ends to said frame and provided with weights at their opposite ends for counterbalancing said frame in said slideway.

4. In a steam bleaching apparatus for a food drier, the combination of the drier provided with a slot in its roof, a spring actuated door in said drier arranged to close said slot, the vertical slideway supports above said drier adjacent to the opposite ends of said slot, with a steam bleaching perforated pipe frame slidably mounted in the slideway supports, a hose secured at one end to said frame and at its opposite end to a steam conveying pipe, a valve for controlling the steam flowing to and through said frame, said drier being provided with product drying chambers adapted to receive car load lots of product to be dried, and said perforated pipe frame comprising a plurality of pipes adapted to be drawn down into said drier through said slot.

5. In a steam bleaching apparatus for a food drier, the combination of the drier provided with a slot in its roof, a spring actuated door in said drier arranged to close said slot, the vertical slideway supports above said drier adjacent to the opposite ends of said slot, with a steam bleaching perforated pipe frame slidably mounted in the slideway supports, a hose secured at one end to said frame and at its opposite end to a steam conveying pipe, a valve for controlling the steam flowing to and through said frame, said drier being provided with product drying chambers adapted to receive car load lots of product to be dried, and said perforated pipe frame comprising a plurality of pipes adapted to be drawn down into said drier through said slot, a counterbalanced frame positioned to be moved reciprocally up and down in said drier by an attendant and to extend to the floor and to the roof and across the entrance to the drying chambers of said drier, and said steam discharging perforations in said frame being arranged to discharge steam into the chambers of said drier.

In testimony whereof we affix our signatures in presence of two witnesses.

ROBERT REA.
FRANK W. WATERS.

Witnesses:
G. SARGENT ELLIOTT,
ELIZABETH SMITH.